(12) United States Patent
Huang et al.

(10) Patent No.: US 10,641,185 B2
(45) Date of Patent: May 5, 2020

(54) SYSTEM AND METHOD FOR MONITORING HOT GAS PATH HARDWARE LIFE

(71) Applicant: General Electric Company, Schenectady, NY (US)

(72) Inventors: Yimin Huang, Simpsonville, SC (US); Hua Zhang, Greer, SC (US); Timothy Andrew Healy, Simpsonville, SC (US); Iris Z. Hu, Greer, SC (US)

(73) Assignee: General Electric Company, Schenectady, NY (US)

( * ) Notice: Subject to any disclaimer, the term of this patent is extended or adjusted under 35 U.S.C. 154(b) by 694 days.

(21) Appl. No.: 15/378,264

(22) Filed: Dec. 14, 2016

(65) Prior Publication Data
US 2018/0163639 A1    Jun. 14, 2018

(51) Int. Cl.
| | | |
|---|---|---|
| *F02C 9/52* | (2006.01) | |
| *F02C 3/04* | (2006.01) | |
| *F02C 7/08* | (2006.01) | |
| *F02C 7/228* | (2006.01) | |
| *F02C 9/54* | (2006.01) | |
| *F02C 9/00* | (2006.01) | |
| *F02C 9/28* | (2006.01) | |
| *F02C 7/05* | (2006.01) | |

(Continued)

(52) U.S. Cl.
CPC ............... *F02C 9/52* (2013.01); *F02C 3/04* (2013.01); *F02C 7/05* (2013.01); *F02C 7/08* (2013.01); *F02C 7/228* (2013.01); *F02C 9/00* (2013.01); *F02C 9/26* (2013.01); *F02C 9/28* (2013.01); *F02C 9/54* (2013.01); *G05B 23/0283* (2013.01); *F05D 2260/80* (2013.01); *F05D 2260/81* (2013.01); *F05D 2260/821* (2013.01); *F05D 2270/11* (2013.01); *F05D 2270/44* (2013.01)

(58) Field of Classification Search
CPC .... F02C 7/04; F02C 7/05; F02C 7/052; F02C 7/055; F02C 7/228; F02C 7/08; F02C 9/00; F02C 9/28; F02C 9/26; F02C 9/52; F02C 9/54; F02C 3/04; F05D 2260/81; F05D 2260/82; F05D 2260/821; F05D 2270/11; F05D 2270/112; F05D 2270/114; F05D 2260/80; G05B 13/04; G05B 23/0283
See application file for complete search history.

(56) References Cited

U.S. PATENT DOCUMENTS

| | | | | |
|---|---|---|---|---|
| 4,622,050 A | * | 11/1986 | O'Connor | ......... B01D 46/0068 55/283 |
| 6,466,858 B1 | * | 10/2002 | Adibhatla | ................ F02C 9/00 701/100 |

(Continued)

*Primary Examiner* — Alain Chau
(74) *Attorney, Agent, or Firm* — Dority & Manning, P.A.

(57) ABSTRACT

A system and a method for predicting and optimizing remaining hardware life of gas turbine components. Operating parameters of the gas turbine which may impact remaining hardware life are sensed and tracked using a plurality of sensors in communication with a control system including a computing device. Remaining hardware life is predicted using a physics-based hardware lifing model. The hardware lifing model may include an output of a filtration model configured to monitor contaminants based on a pressure drop across a filter. Optimizing the remaining hardware life is achieved by the control system adjusting one or more operation settings of the gas turbine.

20 Claims, 3 Drawing Sheets

(51) Int. Cl.
*F02C 9/26* (2006.01)
*G05B 23/02* (2006.01)

(56) References Cited

U.S. PATENT DOCUMENTS

| | | | | |
|---|---|---|---|---|
| 6,681,558 B2* | 1/2004 | Orlando | ............... | F01D 9/041 60/204 |
| 6,871,160 B2* | 3/2005 | Jaw | ............... | G01M 15/00 700/108 |
| 6,955,039 B2* | 10/2005 | Nomura | ............... | F01D 17/162 60/39.27 |
| 6,983,603 B2* | 1/2006 | Macchia | ............... | F01D 17/085 60/39.281 |
| 7,203,554 B2* | 4/2007 | Fuller | ............... | G05B 13/048 700/121 |
| 8,116,990 B2* | 2/2012 | Koul | ............... | G05B 23/0283 324/548 |
| 8,396,643 B2* | 3/2013 | Nomura | ............... | F02C 3/22 701/103 |
| 8,437,880 B2* | 5/2013 | Long | ............... | G06Q 10/063 700/287 |
| 8,510,060 B2* | 8/2013 | Hardwicke | ............... | G05B 23/0283 60/39.091 |
| 8,560,205 B2* | 10/2013 | Nomura | ............... | F02C 3/22 60/329 |
| 9,255,525 B2* | 2/2016 | Ewens | ............... | F02C 9/00 |
| 9,476,361 B2* | 10/2016 | Morgan | ............... | F02C 9/28 |
| 9,933,338 B2* | 4/2018 | Noda | ............... | G05B 23/024 |
| 10,458,342 B2* | 10/2019 | Morgan | ............... | F02C 9/00 |
| 2002/0134070 A1* | 9/2002 | Orlando | ............... | F01D 9/041 60/204 |
| 2004/0073400 A1* | 4/2004 | Tomita | ............... | F02C 9/00 702/181 |
| 2004/0079070 A1* | 4/2004 | Macchia | ............... | F01D 17/085 60/39.091 |
| 2004/0148129 A1* | 7/2004 | Gotoh | ............... | F02C 7/00 702/183 |
| 2005/0209713 A1* | 9/2005 | Fuller | ............... | G05B 13/048 700/29 |
| 2007/0073525 A1 | 3/2007 | Healy et al. | | |
| 2009/0125207 A1* | 5/2009 | Nomura | ............... | F02C 3/22 701/100 |
| 2009/0229468 A1* | 9/2009 | Janawitz | ............... | B01D 46/0032 96/55 |
| 2009/0281737 A1* | 11/2009 | Stadler | ............... | F01D 17/08 702/34 |
| 2011/0172893 A1* | 7/2011 | Nomura | ............... | F02C 3/22 701/100 |
| 2011/0282500 A1* | 11/2011 | Long | ............... | G06Q 10/063 700/287 |
| 2011/0296810 A1* | 12/2011 | Hardwicke | ............... | G05B 23/0283 60/39.091 |
| 2012/0283963 A1* | 11/2012 | Mitchell | ............... | F01D 17/02 702/34 |
| 2014/0123621 A1* | 5/2014 | Driessens | ............... | B01D 46/12 60/39.092 |
| 2014/0156165 A1* | 6/2014 | Ewens | ............... | F02C 9/54 701/100 |
| 2014/0271117 A1* | 9/2014 | Armstrong | ............... | F02C 7/32 415/1 |
| 2015/0007574 A1 | 1/2015 | Morgan et al. | | |
| 2015/0042103 A1* | 2/2015 | Armstrong | ............... | F01D 21/14 290/40 C |
| 2015/0081121 A1 | 3/2015 | Morgan et al. | | |
| 2015/0159603 A1* | 6/2015 | Hiner | ............... | F02C 7/052 73/114.31 |
| 2015/0160098 A1* | 6/2015 | Noda | ............... | G05B 23/024 702/35 |
| 2016/0026739 A1 | 1/2016 | Chopra et al. | | |
| 2016/0160762 A1* | 6/2016 | Chandra | ............... | F01D 21/14 701/100 |

* cited by examiner

SYSTEM AND METHOD FOR MONITORING HOT GAS PATH HARDWARE LIFE

FIELD

The present invention generally involves a gas turbine, such as may be used in a gas turbine based power plant. More specifically, the invention relates to a system and method for monitoring and optimizing hot gas path hardware life in a gas turbine.

BACKGROUND

A turbomachine, such as a gas turbine, generally includes an inlet section, a compressor section, a combustion section that includes a plurality of combustors, a turbine section and an exhaust section. The inlet section cleans and conditions a working fluid (e.g., air) and supplies the working fluid to the compressor section. The compressor section progressively compresses the working fluid and supplies a high pressure compressed working fluid to the combustors where it is mixed with a fuel and burned in a combustion chamber to generate combustion gases having a high temperature and pressure. The combustion gases flow along a hot gas path into the turbine section where they expand to produce work. For example, expansion of the combustion gases in the turbine section may rotate a shaft connected to a generator to produce electricity.

During operation of the gas turbine, various components in the system are subjected to high temperature flows, in particular those components along the hot gas path. Such components are typically known as hot gas path components. The hot gas path components include the combustors and components of the turbine section. Each combustor includes various hardware components. For example, a conventional gas turbine combustor may include one or more fuel nozzles, a combustion liner, a cooling flow sleeve, a transition duct, an impingement sleeve, a cap assembly and/or various mounting hardware such as brackets and radial compression or hula seals. The turbine section generally includes various hardware components that come into direct or indirect contact with the hot combustion gases such as stator vanes, stationary shrouds, rotatable turbine blades, and rotor disks.

Over time, various factors including thermal cycling, vibrations and/or pressure pulses within the gas turbine may result in hardware component degradation. As a result, regularly scheduled outages for inspection and repair must be executed, thus affecting machine availability.

However, in some instances, unplanned outages may be necessary, such as when a hardware component requires maintenance or repair prior to the next regularly scheduled outage. Outages can be detrimental to the efficiency and profitability of a power plant or other gas turbine operation, especially unplanned outages. Thus, there exists a need for a system and method for operating a gas turbine which optimizes the hardware component life to avoid or minimize unplanned outages.

BRIEF DESCRIPTION

Aspects and advantages of the invention are set forth below in the following description, or may be obvious from the description, or may be learned through practice of the invention.

One embodiment of the present invention is a system. The system includes a gas turbine including an inlet section, a compressor, at least one combustor, and a turbine section. The system also includes a plurality of sensors, each sensor is configured to sense and communicate a signal indicative of an operating parameter of the gas turbine. The system also includes a control system including a computing device in electronic communication with each sensor of the plurality sensors, wherein the computing device is configured to receive the signals from the sensors, track the operating parameters indicated by the received signals over time, apply the tracked operating parameters to a physics-based hardware lifing model, and predict remaining hardware life for one or more hot gas path components of the gas turbine based on the hardware lifing model. The control system is configured to adjust one or more operation settings of the gas turbine based on the predicted remaining hardware life to optimize the remaining hardware life.

Another embodiment of the present invention is a method for controlling a gas turbine. The method includes measuring a plurality of operating parameters of the gas turbine with a plurality of sensors, receiving signals indicative of the measured operating parameters with a computing device, tracking the operating parameters indicated by the received signals over time, applying the tracked operating parameters to a physics-based hardware lifing model, predicting remaining hardware life for one or more hot gas path components of the gas turbine based on the hardware lifing model, and adjusting one or more operation settings of the gas turbine based on the predicted remaining hardware life to optimize the remaining hardware life.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION

Figure 1:
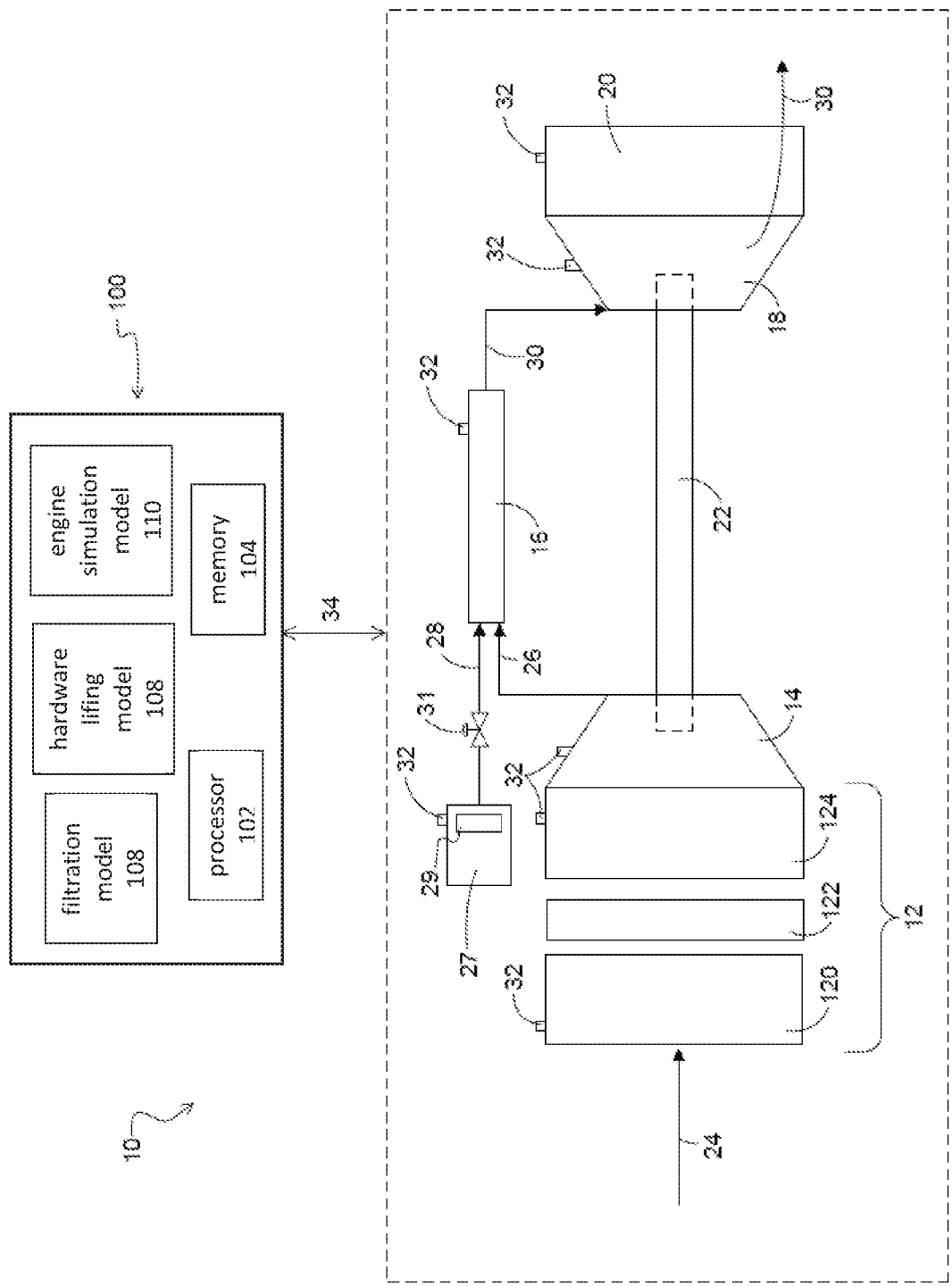
FIG. 1 is a functional block diagram of an exemplary gas turbine within the scope of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. When introducing elements of aspects of the present disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Although exemplary embodiments of the present invention will be described generally in the context of a gas turbine based power plant for purposes of illustration, one of ordinary skill in the art will readily appreciate that embodiments of the present invention may be applied to any turbomachine such as an aircraft gas turbine and/or a marine based gas turbine are not limited to any particular turbomachine unless specifically recited in the claims.

Various operating parameters of the gas turbine may influence the hardware life of a hot gas path component therein. The primary factors which may affect hardware life for a hot gas path component include temperature, pressure, and vibration. The disclosed system and method include tracking operating parameters of the gas turbine, which may include monitoring trends in temperature, pressure, and/or vibration data. As such, according to at least one embodiment, the method and system may include storing at least one of a temperature history, a pressure history, and a vibration history in a computer memory. Based on the one or more stored data trends, a remaining hardware life may be predicted for one or more components such as hot gas path components. The predicted remaining hardware life may then be used to determine optimal operating conditions for the gas turbine in order to optimize hardware life.

Referring now to the drawings, FIG. 1 illustrates a schematic diagram of an exemplary gas turbine 10 that may incorporate various embodiments of the present invention. As shown, the gas turbine 10 generally includes an inlet section 12, a compressor 14 disposed downstream of the inlet section 12, at least one combustor 16 disposed downstream of the compressor 14, a turbine 18 disposed downstream of the combustor 16 and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14. In one configuration, inlet section 12 includes an inlet duct 120 which channels ambient air across air filter 122 and one or more inlet guide vanes 124 and then into the compressor 14. The compressor 14 progressively compresses the ambient air and directs the compressed air 26 to the combustor(s) 16. At least a portion of the compressed air 26 is mixed with a fuel 28 within the combustor 16 and burned to produce combustion gases 30. The combustion gases 30 flow from the combustor 16 into the turbine 18, wherein energy (kinetic and/or thermal) is transferred from the combustion gases 30 to rotor blades 60 (FIG. 2), thus causing shaft 22 to rotate. The mechanical rotational energy may then be used for various purposes such as to power the compressor 14 and/or to generate electricity. The combustion gases 30 exiting the turbine 18 may then be exhausted from the gas turbine 10 via the exhaust section 20. Exhaust section 20 may include various emission control and/or sound absorbing devices and/or a heat recovery system such as a heat recovery steam generator (not shown).

The exemplary system of FIG. 1 further includes a controller or control system 100 in communication with the gas turbine 10. The control system 100 as is described herein may include one or more processors or processing units, system memory, and some form of computer-readable media. In various embodiments, an example of which is illustrated in FIG. 1, the control system 100 includes a computing system or device 112 (FIG. 2) having at least one processor 102 that executes programs and operations to control the operation of the gas turbine 10 using sensor inputs, scheduling algorithms, control models and/or instructions from human operators and a memory 104. One or more models, e.g., a filtration model 106, a hardware lifing model 108, and an adaptive real-time engine simulator (ARES) model 110, may be stored in memory 104 to simulate operations of the gas turbine or parts thereof. The programs and functions executed by the control system 100 may include, among others, sensing and/or modeling operating parameters, operational boundaries, applying operational boundary models, applying scheduling algorithms and applying boundary control logic.

A fuel control system 27 including one or more fuel filters 29 and one or more fuel control valves 31 may be provided to regulate fuel 28 flowing to the combustors 16. The fuel control system 27 may control fuel splits between fuel circuits within each combustor 16 that allow for flow control of the fuel 28 into various fuel nozzles 42 within each combustor 16. The fuel control system 27 also may select fuel type or composition for combustion in the combustors 16 and/or regulate the temperature of the fuel 28, among other operation settings.

Figure 2:
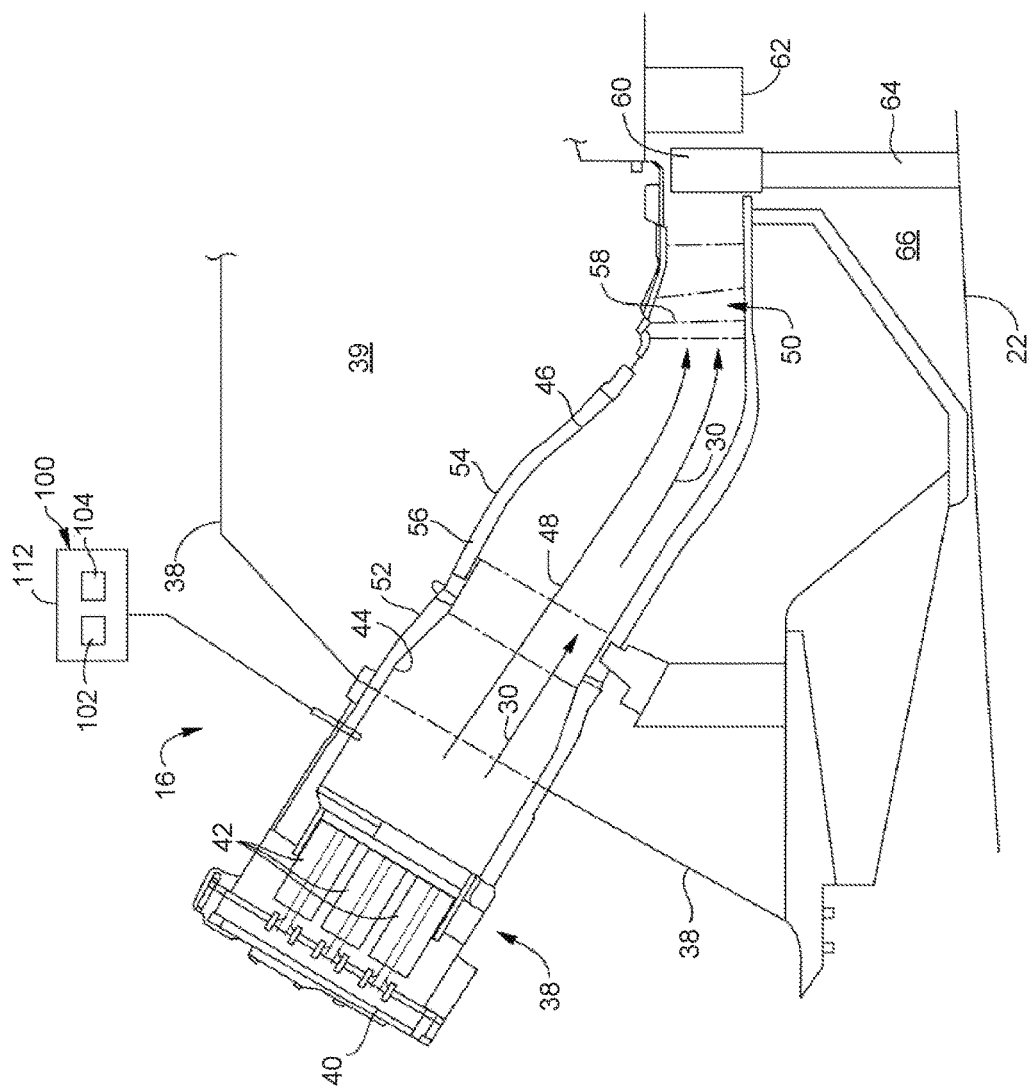
FIG. 2 is a cross sectioned side view of an exemplary combustor as may incorporate various embodiments of the present disclosure.

FIG. 2 provides a cross sectional side view of an exemplary combustor 16 as may incorporate various embodiments of the present invention. As shown, the combustor 16 is at least partially surrounded by a compressor discharge or outer casing 38. An end cover 40 may be coupled to the compressor discharge casing 38. The compressor discharge casing 38 generally forms a high pressure plenum 39 which at least partially surrounds the combustors 16. The high pressure plenum 39 is in fluid communication with the compressor 14.

Various hardware components are disposed within the outer casing 38. For example, the hardware components generally include one or more fuel nozzles 42 extending generally axially downstream from the end cover 40. One or more annular liners such as a combustion liner 44 and/or a transition duct 46 extend downstream from the fuel nozzles 42 so as to define a hot gas path 48 through the compressor discharge casing 38 for routing the hot combustion gases 30 towards an inlet 50 to the turbine 18. An annular flow sleeve 52 may at least partially surround the combustion liner 44 and an annular impingement sleeve 54 may least partially surround the transition duct 46 so as to form an annular cooling flow passage 56 therebetween. A stage or row of stator vanes 58 may be disposed at the turbine inlet 50.

The turbine 18 generally includes various hardware components which come into direct or indirect contact with the hot combustion gases 30 as well. The hot gas path hardware components of the turbine 18 may include but are not limited to one or more rows or stages of rotatable turbine blades 60 and one or more rows of stator vanes 62. The turbine blades 60 may be coupled to the shaft 22 via one or more rotor disks 64 which extend radially outwardly from the shaft 22. During operation, compressed air 26 from the compressor 14 and/or a cooling medium such as steam may be routed into various voids defined between adjacent rotor disks 64, the voids herein referred to as wheel space 66, and/or into various cooling flow paths defined within the turbine rotor blades 60 and/or the stator vanes 58, 62 for cooling of those hardware components or voids.

Returning again to FIG. 1, in some embodiments, various sensors 32 are provided. The sensors 32 may include flow sensors, speed sensors, flame detector sensors, valve position sensors, guide vane angle sensors, temperature sensors, acoustic sensors, pressure sensors and/or other sensors that sense various operating parameters pertinent to the operation of the combustors 16 and/or the turbine 18. As used herein, "operational parameters" refers to items that can be used to define operating conditions of the gas turbine 10, such as temperatures, pressures, and gas flows at defined locations in the gas turbine 10. Measured or sensed operating parameters may include, but are not limited to, compressor inlet pressure and temperature, compressor exit pressure and temperature, turbine exhaust temperature, and generator power output.

In some embodiments, e.g., as illustrated in FIG. 1, the control system 100, and in particular the computing device 112, may be in electronic communication with each sensor 32. In various embodiments, each sensor 32 may be configured to sense or detect various operational parameters of the gas turbine 10 and communicate or transmit those signals 34 which are indicative of the operating parameters back to the control system 100 and/or the computing device 112. The control system 100 may be configured to receive the signals 34 from the one or more of the sensors 32.

In some embodiments, vibration may be monitored by a combustion dynamics monitoring system. In various embodiments, the sensors 32 may comprise one or more of temperature sensors that monitor ambient temperature surrounding the gas turbine 10, compressor inlet temperature, fuel temperature, compressor discharge temperature, combustion gas temperature at the stator vane 58 or inlet 50 to the turbine 18, combustion gas temperature at various stages within the turbine 18, cooling medium flow temperature to wheel space 66 and/or turbine hardware components temperature and turbine exhaust gas temperature. In some embodiments, certain operating parameters may be measured or sensed, e.g., with sensors 32, while other operating parameters may be modeled, e.g., with ARES model 110. For example, temperature and pressure may be measured at the compressor inlet and compressor exit (i.e., compressor discharge), while temperature and pressure at the combustor exit (e.g., at or near the aft end of the transition piece) and/or turbine inlet (e.g., at or near the stage one nozzle of the turbine section) may be modeled in ARES model 110.

In some embodiments, the sensors 32 may include pressure sensors. Pressure sensors may be deployed in various locations throughout the gas turbine 10, including upstream of the inlet section 12, downstream of the inlet section 12, and/or downstream (i.e., at a discharge end) of the compressor 16. In some embodiments, pressure sensors may be provided both upstream of the inlet section 12 and downstream of the inlet section 12, and in particular upstream and downstream of filter 122 in the inlet section 12, to measure the pressure drop across the filter 122 of the inlet section 12. Such embodiments may also include a filtration model 106. For example, the filtration model 106 may be based on the pressure drop across the filter 122 of the inlet section 12 to monitor and account for contaminants in the ambient air, e.g., dust and other particulate matter. A relatively high level of such contaminants in the ambient air may lead to decreased hardware life. In some operating environments, the ambient conditions may include sand particles in the air which may be drawn into the inlet section 12. In such instances, the silica content of the sand particles may melt in or near the hot gas path 48 due to the high temperatures therein, forming glass particles which may abrade the protective thermal barrier coating on one or more of the hot gas path hardware components. Compromising the protective thermal barrier coating may have negative impact on the remaining life of the hardware component with the compromised coating, e.g., may increase corrosion of the component. Thus, it may be advantageous to derive a filtration model 106 based on the pressure drop across the air filter 122 in the inlet section 12 to monitor contaminants and apply an output of the filtration model 106 to the hardware lifing model 108.

As another example of filtration model 106, the sensors 32 may include pressure sensors and/or flow meters associated with the fuel control system 27. In particular, sensors 32 may be disposed on or in communication with the fuel system 27 both upstream and downstream of fuel filter 29. Thus, the filtration model 106 may be based on the drop in pressure and/or fuel flow rate across the fuel filter, as well as or instead of the pressure drop across the air filter 122 in the inlet section 12. Accordingly, the filtration model 106 may monitor and account for fuel contamination. Using filtration model 106 to account for air contamination and/or fuel contamination and applying an output of the filtration model 106 to the hardware lifing model 108 may make the hardware lifing model 108 more accurate.

In some embodiments, various pressure sensors may be included, which may include pressure sensors that monitor or sense at least one of ambient pressure, static and dynamic pressure levels at the compressor inlet and outlet, pressure within the compressor discharge casing, pressure at the turbine exhaust and at other locations in the hot gas path 48 through the gas turbine 10.

In addition or in the alternative, other ambient conditions may be measured instead of or in addition to pressure, such as temperature and/or humidity. For example, the sensors 32 may include various wet bulb thermometers, dry bulb thermometers, and humidity sensors that measure ambient humidity at the inlet duct 120 upstream of the compressor 14. The sensors 32 may also detect or sense generator output.

The control system 100, and in particular the computing device 112 thereof, may be configured to receive the signals 34 from the sensors 32. The control system may be configured to perform various computing operations, e.g., modeling the gas turbine 10 conditions, based on the received signals 34. For example, in some embodiments, the control system 100 may track or monitor data trends of operating parameters such as temperature, pressure, and/or vibration. In some exemplary embodiments, the computing device 112 may be configured to track the operating parameters indicated by the received signals 34 over time.

The control system 100 and computing device 112 may also be configured to apply the tracked operating parameters to a physics-based hardware lifing model 108 and predict remaining hardware life for one or more hot gas path components based on the hardware lifing model 108. As used herein, "hardware life" generally means a useful operating period until maintenance is required, i.e., a component is not necessarily to be taken permanently out of service at the end of the remaining hardware life, rather, in many or most cases the component will be placed back in service after maintenance is completed, although some down time will usually be incurred in order to effect the required maintenance. In essence, the control system 100 is considering how much longer the hot gas path hardware component can continue to operate under the existing conditions without interruption, e.g., without a maintenance outage.

The control system 100 may be configured to adjust one or more operation settings of the gas turbine based on the predicted remaining hardware life to optimize the remaining hardware life. Adjusting one or more operation settings of the gas turbine may include adjusting or controlling various settings or gas turbine inputs such as fuel flow, inlet bleed heating, inlet guide vane angles and other control inputs. Adjusting fuel flow may include adjusting a fuel flow rate and/or adjusting a fuel flow split between a plurality of fuel circuits within the at least one combustor 16.

During operation of the gas turbine 10, regions of relatively higher temperature as compared to the immediately surrounding areas may develop. Such areas may be known as hot spots, and may develop particularly in hot gas path components, such as the combustion liner 44. Adjusting one or more operation settings of the gas turbine to optimize the remaining hardware life may prolong the hardware remaining life by shifting the location of a hot spot, e.g., in the combustion liner 44, to avoid or minimize excessive wear concentrated in a single region of the component. For example, the control system 100 may adjust the combustion mode, which alters the shape, e.g., the length of the flame generated by the combustor(s) 16 and thus shifts the location of a hot spot in the combustion liner 44, such that the thermal load on the combustion liner 44 is not concentrated in one location for an extended period of time.

The present system and method may provide enhanced planning and resource allocation, e.g., by adjusting one or more operation settings of the gas turbine to optimize the remaining hardware life of hot gas path components. Because remaining hardware life is defined with reference to the next required maintenance outage, optimizing remaining hardware life generally comprises comparing the remaining hardware life with a scheduled maintenance outage or outages. As such, optimizing remaining hardware life for hot gas path components may include prolonging the remaining hardware life to avoid a forced outage prior to the next scheduled maintenance outage. In other instances, e.g., when the remaining hardware life of one or more hot gas path components extends beyond the next scheduled maintenance outage for the gas turbine 10, optimizing remaining hardware life may include changes to operating conditions in order to meet other goals such as increased efficiency and/or output, where such changes may also result in decreased remaining hardware life of the one or more hot gas path components.

The maintenance schedule is dictated by the component with the least life expectancy, i.e., the entire gas turbine must be taken offline, incurring significant downtime and attendant costs, whenever any single part has used up its remaining hardware life and maintenance or repair is required. As such, adjusting one or more operation settings of the gas turbine to optimize the remaining hardware life may include prolonging the remaining hardware life at least for the component with the shortest remaining hardware life, which may permit postponing the next scheduled maintenance outage. Postponing the next scheduled maintenance outage can result in economic benefits.

Figure 3:
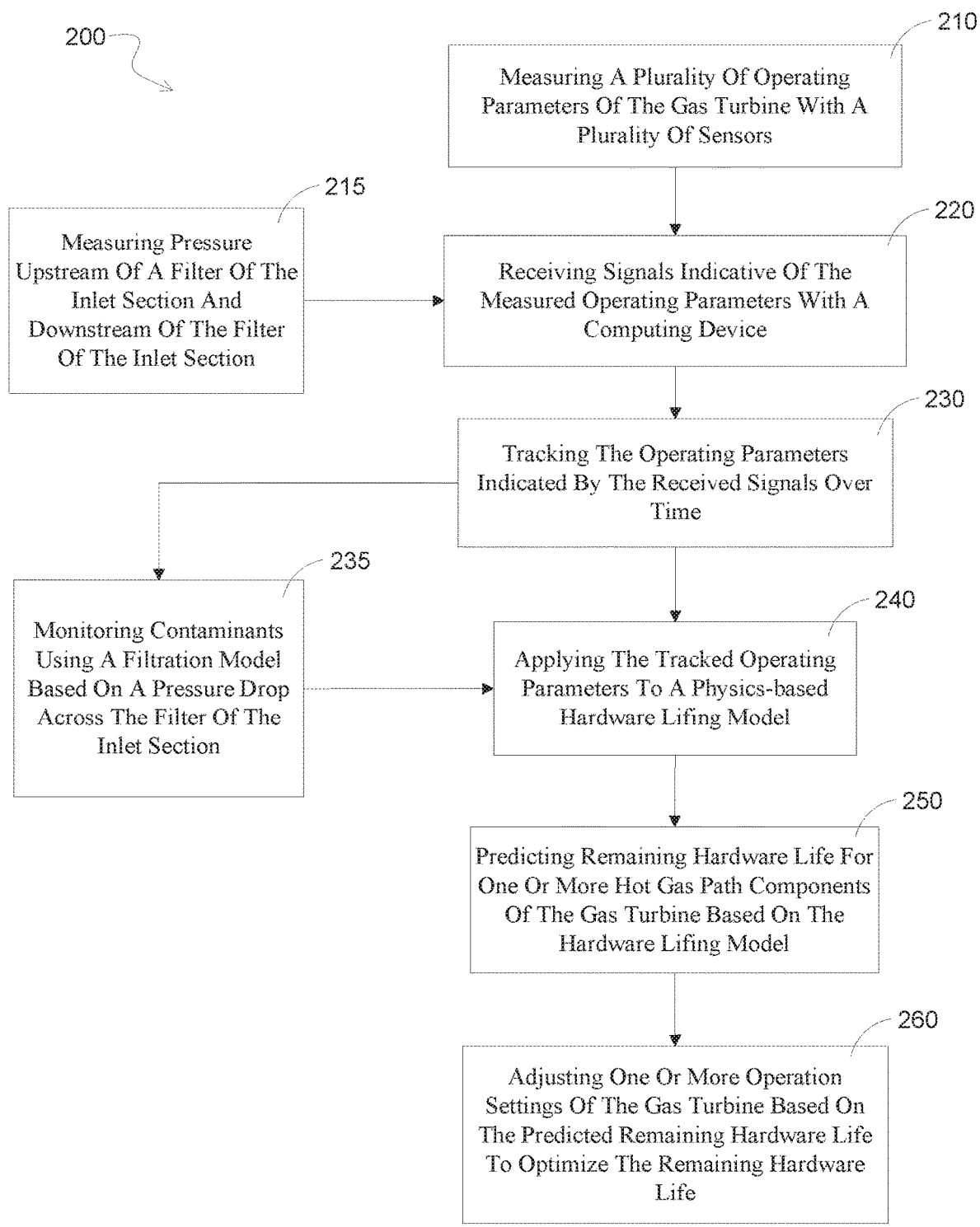
FIG. 3 provides a flow diagram of an exemplary method for operating a gas turbine according to one or more embodiments of the present invention.

FIG. 3 illustrates an exemplary method 200 for controlling a gas turbine. The method 200 may include various steps. In the illustrated example, the method 200 includes a step 210 of measuring a plurality of operating parameters of the gas turbine with a plurality of sensors. The operating parameters measured in the step 210 of measuring may include pressure, and in particular the method may include a step 215 of measuring pressure upstream of a filter of the inlet section and downstream of the filter of the inlet section. The exemplary method 200 may further include a step 220 of receiving signals indicative of the measured operating parameters with a computing device and a step 230 of tracking the operating parameters indicated by the received signals over time. In some embodiments, the exemplary method 200 may include a step 235 of monitoring contaminants using a filtration model based on a pressure drop across the filter of the inlet section. The exemplary method 200 may further include a step 240 of applying the tracked operating parameters to a physics-based hardware lifing model, a step 250 of predicting remaining hardware life for one or more hot gas path components of the gas turbine based on the hardware lifing model, and a step 260 of adjusting one or more operation settings of the gas turbine based on the predicted remaining hardware life to optimize the remaining hardware life. The step 240 of applying the tracked operating parameters to a physics-based hardware lifing model may also, in some embodiments, comprise applying an output of the filtration model from step 235 to the hardware lifing model.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system comprising: a gas turbine including an inlet section, a compressor, at least one combustor, and a turbine section;
   a plurality of sensors, each sensor being configured to sense an operating parameter of the gas turbine and communicate a signal indicative of the sensed operating parameter;
   a control system including a computing device in electronic communication with each sensor of the plurality sensors, wherein the computing device is configured to:
   receive the signals from the sensors;
   track the operating parameters indicated by the received signals over time;
   apply the tracked operating parameters to a physics-based hardware lifing model; and
   predict remaining hardware life for one or more components of the gas turbine based on the hardware lifing model;
   compare the predicted remaining hardware life for each of the one or more components of the gas turbine with a scheduled maintenance outage; and
   wherein the control system is configured to adjust one or more operation settings of the gas turbine based on the predicted remaining hardware life for the one or more components of the gas turbine to optimize a remaining hardware life of the one or more components of the gas turbine, wherein the adjusting one or more operation settings comprises shifting the location of at least one hot spot of the one or more components of the gas turbine based on the predicted remaining hardware life to optimize the remaining hardware life of the one or more components of the gas turbine; wherein the control system is configured to use the step of adjusting one or more operation settings to prolong the remaining hardware life of a component of the one or more components of the gas turbine having the shortest predicted remaining hardware life based on the hardware lifing model.

2. The system of claim 1, wherein the plurality of sensors includes pressure sensors deployed upstream of a filter of the inlet section and downstream of the filter of the inlet section; and the hardware lifing model includes receiving an input to the hardware lifing model from a filtration model configured to monitor contaminants based on a pressure drop across the filter of the inlet section.

3. The system of claim 1, wherein the plurality of sensors includes at least one of a temperature sensor, a pressure sensor and a humidity sensor.

4. The system of claim 1, wherein the one or more components of the gas turbine comprise one or more hot gas path components, and the computing device is configured to adjust one or more operation settings of the gas turbine in order to prolong the remaining hardware life for the one or more hot gas path components in response to a customer requirement to prolong the hardware life.

5. The system of claim 1, wherein the one or more operation settings of the gas turbine the computing device is configured to adjust include one or more of inlet bleed heating, fuel flow, and inlet guide vane angle.

6. The system of claim 1, wherein the computing device is configured to adjust fuel flow rate.

7. The system of claim 1, wherein the computing device is configured to adjust fuel flow split between a plurality of fuel circuits within the at least one combustor.

8. The system of claim 1, wherein the one or more components of the gas turbine is one or more of a combustion liner, a transition duct, a fuel nozzle, a stationary turbine vane and a turbine blade.

9. The system of claim 1, wherein the one or more sensed operating parameters of the gas turbine includes at least one of compressor inlet temperature, compressor inlet pressure, compressor discharge temperature, compressor discharge pressure, and combustion dynamics.

10. The system of claim 9, wherein the one or more components of the gas turbine comprise one or more hot gas path components, and the computing device is configured to store at least one of a temperature history, a pressure history, and a vibration history of the one or more hot gas path components in a computer memory.

11. A method for controlling a gas turbine, comprising:
measuring a plurality of operating parameters of the gas turbine with a plurality of sensors;
receiving signals indicative of the measured operating parameters with a computing device;
tracking the operating parameters indicated by the received signals over time;
applying the tracked operating parameters to a physics-based hardware lifing model;
predicting remaining hardware life for one or more components of the gas turbine based on the hardware lifing model;
comparing the predicted remaining hardware life of each of the one or more components of the gas turbine with a scheduled maintenance outage; and
adjusting one or more operation settings of the gas turbine based on the predicted remaining hardware life for the one or more components of the gas turbine to optimize a remaining hardware life of the one or more components of the gas turbine, wherein optimizing the remaining hardware life of the one or more components of the gas turbine comprises using the step of adjusting one or more operation settings to prolong the remaining hardware life of the one or more gas turbine components having the predicted remaining hardware life ending prior to the scheduled maintenance outage.

12. The method of claim 11, wherein the step of measuring comprises measuring pressure upstream of a filter of an inlet section and downstream of the filter of the inlet section; the method further comprises a step of monitoring contaminants using a filtration model based on a pressure drop across the filter of the inlet section; and the step of applying the tracked operating parameters to a physics-based hardware lifing model comprises applying an output of the filtration model to the hardware lifing model.

13. The method of claim 11, wherein the step of measuring comprises measuring at least one of temperature, pressure, and humidity.

14. The method of claim 11, wherein the one or more components of the gas turbine comprise one or more hot gas path components, and adjusting one or more operation settings of the gas turbine based on the predicted remaining hardware life to optimize the remaining hardware life comprises adjusting one or more operation settings of the gas turbine in order to prolong the remaining hardware life for one or more hot gas path components in response to a customer requirement to prolong the hardware life.

15. The method of claim 11, wherein the step of adjusting one or more operation settings of the gas turbine based on the predicted remaining hardware life to optimize the remaining hardware life comprises adjusting one or more of inlet bleed heating, fuel flow, and inlet guide vane angle.

16. The method of claim 11, wherein the step of adjusting one or more operation settings of the gas turbine based on the predicted remaining hardware life to optimize the remaining hardware life comprises adjusting fuel flow rate.

17. The method of claim 11, wherein the step of adjusting one or more operation settings of the gas turbine based on the predicted remaining hardware life to optimize the remaining hardware life comprises adjusting fuel flow split between a plurality of fuel circuits.

18. The method of claim 11, wherein the step of predicting remaining hardware life for one or more components comprises predicting remaining hardware life for one or more of a combustion liner, a transition duct, a fuel nozzle, a stationary turbine vane and a turbine blade.

19. The method of claim 11, wherein the step of measuring a plurality of operating parameters includes measuring at least one of compressor inlet temperature, compressor inlet pressure, compressor discharge temperature, compressor discharge pressure, and combustion dynamics.

20. The method of claim 11, wherein the one or more components of the gas turbine comprise one or more hot gas path components, and the step of tracking the operating parameters comprises storing at least one of a temperature history, a pressure history, and a vibration history of the one or more hot gas path components in a computer memory.

* * * * *